United States Patent Office 2,708,195
Patented May 10, 1955

2,708,195

DIPIPERAZINE CALCIUM CITRATE AND METHOD OF PREPARING SAME

Bernard Abramson, White Plains, and Ernest L. Beals, Tuckahoe, N. Y., assignors to Burroughs Wellcome & Co. (U. S. A.) Inc., Tuckahoe, N. Y., a corporation of New York No Drawing. Application March 10, 1954,
Serial No. 415,413

4 Claims. (Cl. 260—268)

Our invention relates to novel compositions suitable for oral administration in the treatment of pin worm infections. Pin worms are parasitical organisms whose eggs are normally introduced into the system orally by contact with contaminated objects. In the digestive tract the eggs hatch and the worms eventually reach the colon or large intestine and occasionally the appendix. The adult forms of the parasite mature in these regions attaining a length of about one-half inch. The gravid females then issue from the anus usually at night and deposit their eggs. These activities frequently cause irritation, itching and distress in the affected areas.

Suggestions for the use of the chemical piperazine, usually as the hydrate, have been made for treatment of pin worm infections and the medication is administered as a neutralized solution. Unsuccessful attempts have been made at the formulation of the drug in tablet form and most dry preparations are either unstable or have an extremely unpleasant or bitter taste.

Many piperazine salts are hydroscopic or cannot be obtained in the form of discrete compounds of fixed and definite composition. Still others, such as piperazine dihydrochloride, have an objectionably strong acid taste, while many are disagreeably saline to the tongue.

In the attempt to provide an acceptable salt of piperazine evaporation of an aqueous solution of piperazine citrate containing mole for mole of acid and base produces a salt of unobjectionable flavor, but on drying becomes deficient in piperazine. Another salt formulated by combining 3 moles of piperazine with 2 moles of citric acid is surprisingly stable on drying but in taste is acidulous and saline.

It has been found that a calcium piperazine citrate containing one atomic proportion of calcium to two molecular proportions each of piperazine and citric acid produces a dry, compressible piperazine salt that is practically tasteless and remarkably stable in composition. This compound is dipiperazine calcium dicitrate. In the light of the related piperazine citrates and the known tendency of citric acid to form poorly dissociated complex salts it appears likely that some sort of sterically enclosed complex results from the reaction. The structural configuration of this arrangement may be postulated as follows:

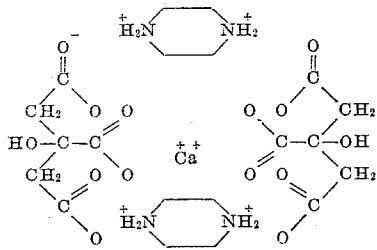

The difference in taste as compared with tripiperazine dicitrate could be a matter of solubility, but whatever the reason the salt which is the subject of the present invention has all the desirable properties for a medicinal preparation in dry form for tablation.

The novel compound may be formed by combining the proper molecular proportion of citric acid with calcium carbonate and thereafter adding to the solution the required moles of piperazine hexahydrate.

Example

Two moles of anhydrous citric acid are dissolved in 1250 cc. of distilled water while the temperature of the solution is maintained below 30° C. To this is slowly added one mole of calcium carbonate while the mixture is stirred. When the effervescence ceases and a clear solution develops two moles of piperazine hexahydrate are added to the solution while the temperature is maintained below 30° C. The solution is then filtered immediately and 1250 cc. of anhydrous alcohol slowly added to the filtrate with rapid stirring. The stirring is continued until a thick, white, crystalline slurry forms in the solution. The solids are filtered and washed with 625 cc. of 50% alcohol and then with an additional 625 cc. of anhydrous alcohol. The resulting dipiperazine calcium dicitrate is dried at a temperature of 120° F. and compressed into tablet form.

The compound was a white amorphous powder, non-hydroscopic, stable to heat and entirely odorless. It was slightly soluble in water, soluble in dilute HCl, insoluble in alcohol, acetone and ether. It had a molecular weight of approximately 594.59. By analysis the piperazine, nitrogen and calcium contents corresponded to the theoretical quantities.

We claim:

1. Dipiperazine calcium dicitrate.
2. The method of forming dipiperazine calcium dicitrate which comprises reacting two moles of citric acid with one mole of calcium carbonate and two moles of piperazine hexahydrate and recovering the product.
3. The method set forth in claim 2 wherein the temperature of the reaction is maintained below 30° C.
4. The method set forth in claim 2 wherein the reaction mixture is treated first with aqueous alcohol and then with anhydrous alcohol.

No references cited.